May 18, 1937.  H. J. N. H. KESSENER  2,081,039
METHOD OF AND APPARATUS FOR SEWAGE SLUDGE DIGESTION
Filed Dec. 30, 1933  2 Sheets-Sheet 1
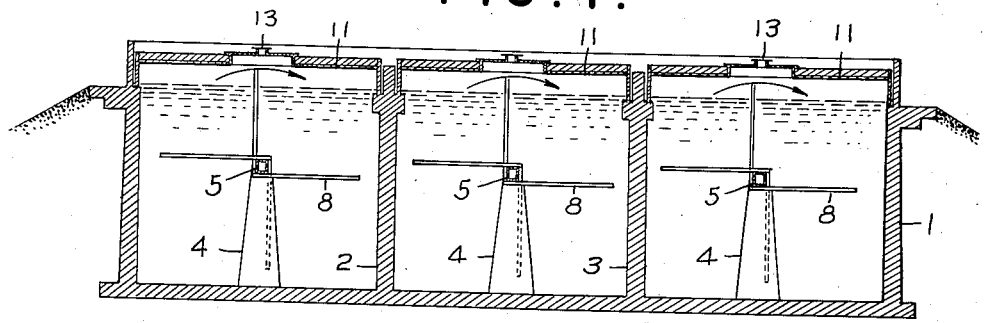
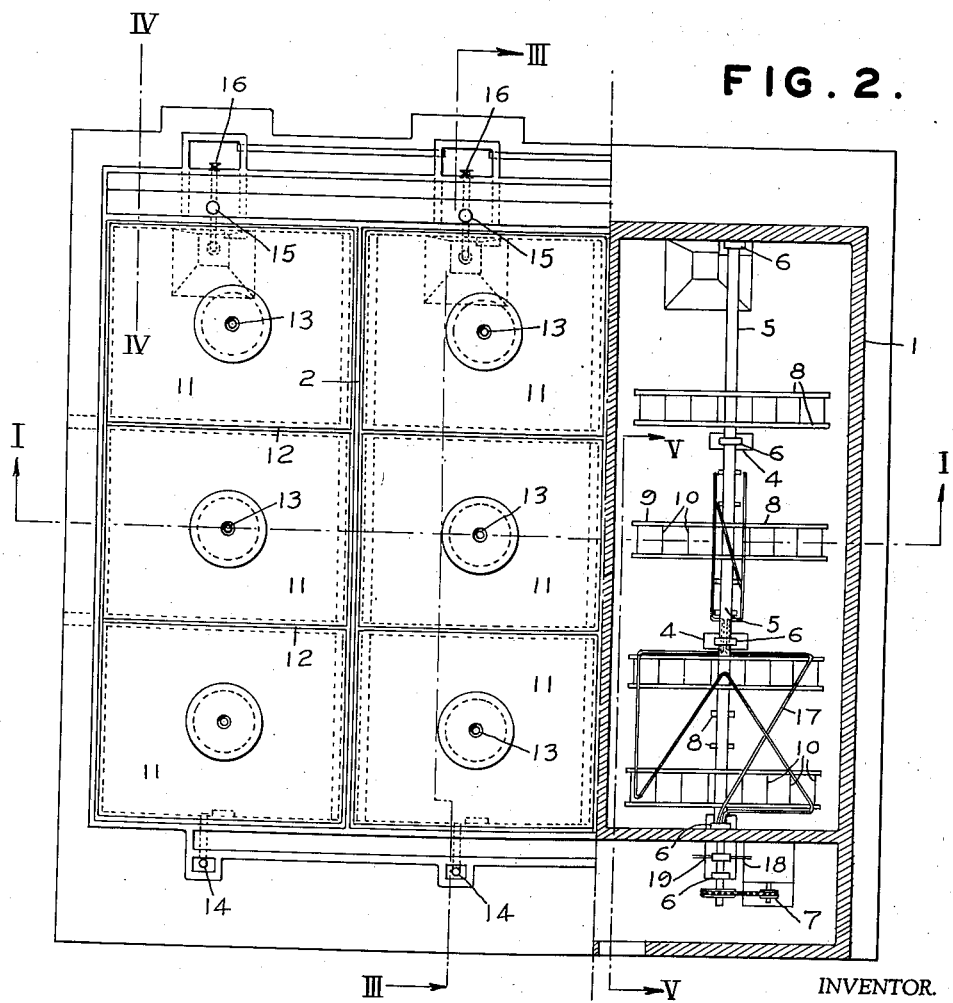
INVENTOR.
HERMAN J. N. H. KESSENER,
BY Arthur Middleton
ATTORNEY.

May 18, 1937.  H. J. N. H. KESSENER  2,081,039
METHOD OF AND APPARATUS FOR SEWAGE SLUDGE DIGESTION
Filed Dec. 30, 1933  2 Sheets-Sheet 2
FIG. 3.
FIG. 4.
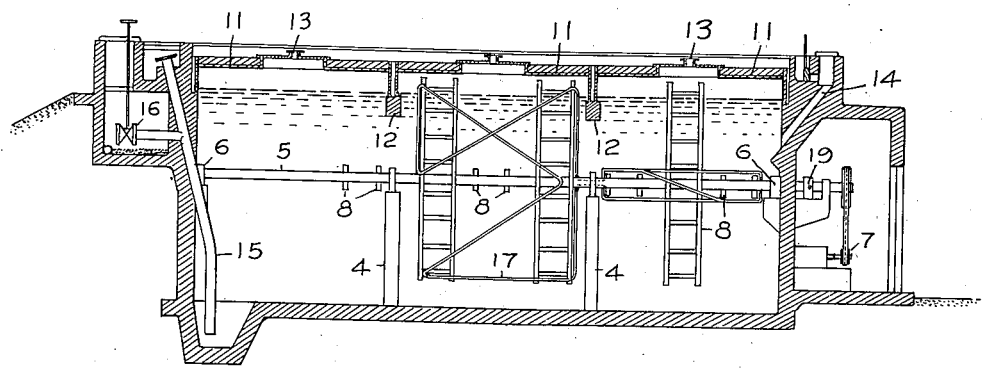
FIG. 5.
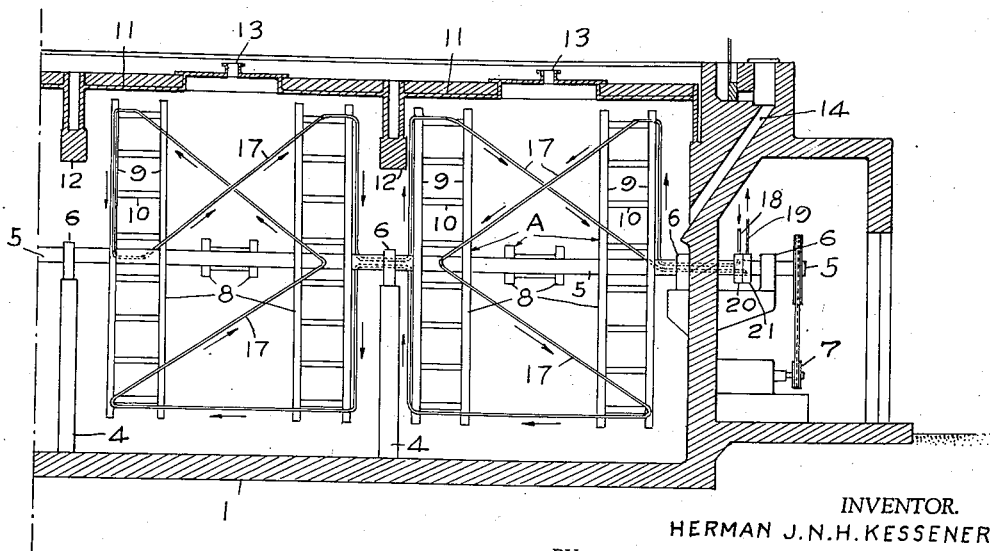
INVENTOR.
HERMAN J.N.H. KESSENER
BY Arthur Middleton
ATTORNEY.

Patented May 18, 1937

2,081,039

UNITED STATES PATENT OFFICE 2,081,039

METHOD OF AND APPARATUS FOR SEWAGE SLUDGE DIGESTION

Herman Joseph Nicolaas Hubert Kessener, The Hague, Netherlands, assignor to The Dorr Company, Inc., New York, N. Y., a corporation of Delaware Application December 30, 1933, Serial No. 704,710

8 Claims. (Cl. 210—2)

This invention relates to improvements in sewage sludge digestion and more particularly to a method and apparatus devised to stimulate and hasten digestion, to improve operation of a digestion tank and to obtain a higher gas production.

It is known that by stirring the sludge in a digestion tank, the digestion process is accelerated and it is recognized that such stirring is most beneficial if done in the so-called "active zone" of the digestion tank, that is, in the zone where the fresh sludge particles are in contact with partly digested or digesting sludge, consequently where the most active digestion takes place.

In digesters of known type where the stirring is accomplished by blades raking at the bottom, the stirring is most beneficial, when the active digestion zone is near the bottom and becomes less effective the higher the level of the active zone is. Moreover, in such digesters special scum breaking arms are required.

In digesters of another known type, equipped with vertical circulating draft-tube devices, the entire mass of sludge in the tank or at least the greater part of it, must be circulated to affect the sludge of the active zone. Vertical circulating devices of commercial size can only serve a certain tank area and affect a limited tank volume and in tanks of larger diameter a number of devices are necessary to prevent dead zones.

Moreover, in digesters of the above type the discharge openings of the vertical circulation or draft tubes must be above the liquid level to insure scum breaking action and the effectiveness of impellers is limited to a certain area.

The objects of this invention are to obtain more effective sewage sludge digestion by improved sludge stirring and scum removal; to improve the sludge heating means; to prevent short-circuiting of undigested sludge; to prevent dead zones in the digesting sludge; and to induce progressive digestion of the sludge being treated; all by simple and inexpensive means.

In accordance with my invention certain of the above noted objects are obtained, and a highly effective and economical method of stimulating and hastening digestion is provided by stirrers having a horizontal or approximately horizontal rotating shaft carrying paddle blades or tubes, the path of which blades reaches to a certain distance above the liquid level whereby the rotation of said blades brings about the breaking up and submerging of the inevitable digester scum. Also the floating scum layer is affected over the entire area thereof by the alternate emerging and submerging action of the paddle blades, by which action the scum is submerged and thereby ultimately dissipated and removed effectively.

By using more or less blades or paddles respectively in vertical zones of my horizontal digester, various degrees of stirring of the sludge can be had in the different vertical zones, even to the omission of stirring in one or more, so that digestion may be made progressive or regressive, as may be desired.

The digestion process can be accelerated by heating the contents of the tank by means of heating devices which may be attached to the blades or stirrers, thus accomplishing an equal heat distribution throughout the digesting mass in the digester and reducing the possibility of incrustation of dried sludge on the heating devices. Or the heating devices, of course, may be fixed to any part of the tank.

Another advantage of these stirrers interposed in the horizontal path taken by the sludge between inlet and outlet of the digester is that short circuiting of the incoming fresh sludge i. e. direct removal of this sludge through the outlet without going through the digestion process is prevented with certainty.

The stirrers can be constructed of wood and therefore will not be affected by carbon dioxide.

The apparatus can be worked continuously or intermittently and when a variable speed motor is used, it can be run at different speeds, giving gentle or more violent stirring, as conditions require.

With these and possibly other objects in view, the invention is disclosed in the accompanying drawings wherein illustrative arrangements of the apparatus are shown, more or less schematically, by means of which the method of my invention may be carried out.

Fig. 1 is a cross section of Figure 2 over the line I—I in side elevation.

Fig. 2 shows the digestion tank from the top, partially in cross section.

Fig. 3 is a cross section of Figure 2 over the line III—III in side elevation.

Fig. 4 a sectional view over the line IV—IV of Fig. 2.

Fig. 5 a sectional view on a larger scale over the line V—V of Fig. 2 in which the set of stirrers A is turned over an angle of 90°.

By I the digestion tank is indicated. In this example the tank is divided into three compartments, for instance by means of the partition walls 2 and 3. In each compartment supports 4 are arranged, supporting the horizontal shaft 5, which is mounted in bearings 6 and extends through the wall at one side of the tank. The shaft 5 is driven outside the tank by any suitable means, e. g. an electric motor 7, via reduction gear. On the shaft are mounted the paddle agitating elements or scum depressors or stirrers 8, consisting of arms 9 and paddle blades 10. The tanks may have covers 11, supported by the partition walls 2 and 3 and by beams 12. The covers 11 have a gas collecting dome or outlet 13. The tank 1 has a sludge inlet 14 and sludge is discharged through an outlet pipe 15, having a valve 16.

Heating coils or pipes 17 are attached to the stirrers 8, preferably arranged in zig-zag fashion as shown more clearly in Fig. 5. Heating water is supplied thereto through the line 18 and flows out through line 19. Since the shaft 5 rotates the heating water is introduced into the line 18 by means of a stuffing box 20 and removed from the line 19 by means of another stuffing box 21.

The tanks may be of any suitable dimensions, and while a three-compartment tank is shown, it is to be understood that only one compartment may be used, or that each compartment is a complete digester of itself. Indeed, the other tank compartments shown might well be settlers discharging sewage sludge to the digester compartment of the group, in a well-known manner. This shows how my digester lends itself to compact association with other sewage treating rectangular units.

It will be observed from Fig. 3 that vertical zones of sewage sludge stirred to different degrees or intensities can be realized, for instance by having less paddle-blades in the third of the digester tank nearest the inlet 14 end of the digester, more paddle-blades in the middle third, and no paddle-blades at all in the third of the digester tank nearest the outlet or discharge end thereof. Fig. 2 shows a reversal of this idea, namely, more blades in the feed zone, and an equal number of blades in both the middle zone and in the discharge zone. Since the biological digestive processes can be speeded up by agitation, varying degrees or intensities of digestion or bacteriological activity can thus be realized in the different zones by the amount of agitation induced in the zone surrounded or affected by each stirrer element 8. If desired two stage digestion may be adopted, in which case a tank as described above can be used for the first stage and any suitable other tank, if desired with a gas holder on top, can be used for the second quiescent stage.

In operation, the tank is normally filled to the level indicated, so that the path of travel of the paddle blades will carry the blades a short distance above this level. That is, the blades will repeatedly emerge from and submerge in the digester contents. Fresh sludge enters through the inlet 14, displacing or otherwise discharging supernatant liquor at the discharge end of the tank in a suitable manner. As appears from Fig. 4 the supernatant flow may be discharged through the channel 22 and overflow 23.

In this way supernatant discharge means are arranged to communicate with the tank interior at a point substantially below the tank top or cover 11 and so as to have a point of discharge delivery also located below the cover, whereby there is normally established a liquid level of substantially predetermined elevation in the tank and which level is spaced from said top to establish a gas collecting space below the top and into which space the outer end portions of the paddle agitating elements 8 may extend.

By operating the stirrers the fresh sludge is mixed effectively with the tank contents at the inlet end of the tank, whereby short-circuiting of the fresh sludge is prevented. The whole tank contents are stirred and the scum on the surface is submerged. Gas is collected at the outlets 13 and transported to the gas storage tank (not shown). Fully digested sludge is removed through the outlet pipe 15.

More particularly, however, the stirrers 8 or paddle blades in the feed zone of the digester (the right end in Fig. 3) serve the purpose of inoculating the fresh sludge being fed to the digester through feed-pipe 14, with digesting sludge. That is, the digesting sludge is stirred up and mixed with the fresh sludge so that the active sludge digesting bacteria are disseminated or seeded through the fresh sludge to hasten the commencement of the digestion process in the fresh sludge. The agitation for this purpose, under some conditions preferably may be more intense than in the zones of influence of other paddles or stirrers 8, as shown in Fig. 2, or, under other conditions the agitation in the zone of influence of the stirrer for the purpose of inoculating the incoming fresh sludge need not be as intense as that required in another zone such as in the zone of influence of the middle stirrer, as shown in Fig. 3, the intensity of agitation in the embodiments of this invention herein illustrated depending upon the number of paddle blades used on the respective stirrer elements 8. For instance, in the modification shown in Fig. 2, twice as many blades are used in the inlet or feed zone as in the middle zone, while in the arrangement shown in Fig. 3, this relationship is reversed. In the arrangement shown in Fig. 5, there are the same number of paddle blades in both the first and middle zones, to meet other possible conditions.

So in the first or fed end paddle or stirrer zone, bacteriological inoculation of the fresh sludge takes place. In the middle paddle zone, the digestion process reaches its peak of activity, so this may be termed the digestion zone, that is, the digesting mass of sewage sludge is agitated or mixed, and kept in sufficient movement to keep digesting action progressing in a desirable and efficient manner. Also in this middle zone more scum is produced than in the other zones due to peak of digestion activity being reached therein, so this middle zone is the place of most effective scum breaking and diffusing. From the middle paddle zone, the sludge passes into the third or end zone where agitation is tapered off, or even avoided at least to an extent which will permit the solids in suspension in the digester mass to settle by sedimentation to the end that the digested and settled sludge may be withdrawn from the third zone by means of a sludge discharge device such as pipe 15. While some digestion goes on in each zone, especially since these zones are not clearly defined or separated but constitute a zone of influence of a paddle or stirrer, the first or fed zone may be termed the inoculation zone, the middle one the digesting and scum breaking zone, and the third or final one the sedimentation zone. The paddles or stirrers are preferably intermittently operated, with the periods of operation and the intervals therebetween being sufficient to maintain continuity of the digestion processes, and this can be readily determined by any skilled digester plant operator.

Progression of the sludge through the digester tank can be controlled partly by the amount of sludge fed to the digester, and partly by the length of time of operation of the paddles or stirrers, the average time of progression of the sludge through the tank being two months.

The transverse beams 12, aside from serving as supporting members for the tank-cover sections 11, also function in the way of scum-intercepting baffles in that they prevent floating scum to traverse along with the general flow of the sewage from end to end of the tank and to the supernatant offtake where it is not wanted. That is to say, the scummy matter, as it rises from the digesting sewage sludge, for instance, in the central portion intermediate the ends of the tank and defined by the two beams or baffles 12, will become trapped in that section at the liquid surface which lies between these two baffles until it is beaten down and back into the underlying body of sewage sludge by the action of the stirrers or paddle elements 8. The action of these stirrers upon the sewage sludge takes place substantially in vertical zones or planes in the body of sewage sludge and normal to the paddle shaft and thus in a manner to avoid imparting to the tank contents a longitudinal component movement parallel to the shaft.

It will be understood that this invention is not limited to the method and apparatus described, but that any modification desired can be made within the scope of this invention, as will be clear to the expert skilled in the art.

What I claim is:

1. A horizontally and longitudinally extending sewage sludge digestion tank having a gas collecting gas-tight top structure including gas offtake means, which tank is adapted to have sludge liquid to be treated by anaerobic digestion pass therethrough in a general horizontal longitudinal direction while being subjected to agitation effect, which digestion has concurrent therewith the formation of scum and floating sewage matter at the liquid surface, said tank having an inlet to supply fresh sludge at one end thereof and an effluent discharge means at the other end arranged to communicate with the tank interior at a point substantially below the body of said top structure and having a point of discharge delivery also located below the body of said top structure, whereby there is normally established a liquid level of substantially predetermined elevation in the tank and which level is spaced from said top structure to establish a gas collecting space below the top structure; said digester tank having a plurality of successive transverse sections respectively referred to as the first or sludge-receiving and inoculation section, as the second or sludge-digestion and scum-breaking section, and as the third or sedimentation section; which sludge-digestion tank has associated therewith sludge-agitating mechanism which comprises paddle elements carried by a horizontally-disposed submerged shaft extending parallel to the general flow path of the sludge as defined by the entrance thereof into the tank and the supernatant liquid discharge from the tank, which paddle elements are arranged to be effective to agitate the sludge in substantially none but vertical planes or zones normal to the paddle shaft and thus in a manner to avoid imparting to the tank contents a longitudinal component movement parallel to the shaft, which paddle elements are also effective to cause the incoming fresh sludge to become effectively exposed to and inoculated with active bacteria in the digesting sludge in the first or sludge-receiving and inoculating zone during its progress within said inoculating zone, and which baffle elements are dimensioned to extend above the liquid level into said gas collection space during a part of their movement, so as to be effective to beat down scum which they encounter in the upper strata or at the surface of the tank contents.

2. In combination with a horizontally and longitudinally-extending relatively gas-tight sewage sludge digestion tank, adapted to have the sludge to be treated by anaerobic digestion pass therethrough in a general longitudinal direction while being subjected to agitation, and which tank has a fresh sludge inlet on the one hand, and a supernatant offtake and a settled-sludge outlet on the other hand, at the respective opposed ends of the tank, and gas-collecting and gas-offtake means including a gas-tight top for the tank, a sludge-agitating mechanism which comprises a submerged substantially horizontal shaft extending parallel to the general flow path of the sludge as defined by the entrance thereof into the tank and the supernatant liquid offtake from the tank, paddle elements extending from said shaft and rotatable therewith and effective to agitate the sludge in substantially none but vertical planes or zones normal to the shaft and thus in a manner to avoid imparting to the tank contents any longitudinal component movement parallel to the shaft, said supernatant offtake being arranged at an elevation whereby the liquid level in the tank is maintained at an elevation which leaves a gas-collecting space available within the tank below said gas-tight top, which space lies within the path of said paddle elements, and which paddle elements are consequently dimensioned to extend above the liquid level during a part of their movement, so as to be effective to beat down scum which they encounter in the upper strata or at the surface of the tank contents.

3. A horizontally and longitudinally-extending sewage-sludge digestion tank adapted to have the sludge to be treated by anaerobic digestion pass therethrough in a general longitudinal direction while being subjected to agitation, and which tank has a fresh sludge inlet on the one hand and supernatant offtake and a settled sludge discharge means on the other hand at the respective opposed ends of the tank, and gas-collecting and gas-offtake means, including a gas-tight top structure for the tank having a gas-collecting space therebelow, a sludge-agitating mechanism which comprises a submerged substantially horizontal shaft extending parallel to the general flow path of the sludge as defined by the entrance thereof into the tank and the supernatant liquid offtake from the tank, a series of paddle elements extending from the shaft and arranged therealong and rotatable therewith, and effective to agitate the sludge in substantially none but vertical planes or zones normal to the shaft and thus in a manner to avoid imparting to the tank contents any longitudinal component movement parallel to the shaft, which paddle elements are furthermore arranged and dimensioned to be effective to beat down scum which they encounter in the upper strata or at the surface of the tank contents, and scum-intercepting baffle means extending transversely of the tank intermediate the ends thereof and arranged to prevent scum from moving along the liquid surface to the supernatant take-off without having been beaten down by said paddle elements.

4. A horizontally and longitudinally extending sewage sludge digestion tank having a gas collecting gas-tight top structure including gas offtake means, which tank is adapted to have sludge liquid to be treated by anaerobic digestion pass therethrough in a general horizontal longitudinal direction while being subjected to agitation effect, which digestion has concurrent therewith the formation of scum and floating sewage matter at the liquid surface, said tank having an inlet to supply fresh sludge at one end thereof and an effluent discharge means at the other end arranged to communicate with the tank interior at a point substantially below the body of said top structure and having a point of discharge delivery also located below the body of said top structure, whereby there is normally established a liquid level of substantially predetermined elevation in the tank and which level is spaced from said top structure to establish a gas collecting space below the top structure; agitating and scum depressing mechanism which comprises a submerged substantially horizontal shaft extending in the direction of the general flow path from end to end of the tank, a series of paddle elements extending from the shaft and effective to agitate the sludge in zones normal to said shaft and thus in a manner to avoid imparting to the tank contents substantially any longitudinal component movement parallel to the shaft, said paddle elements furthermore extending above the liquid level as defined by said effluent discharge means, and extending into said gas space during the phase of emergence in the cycle of rotation, and having extremities designed to act as scum depressing portions when said paddle agitating elements function incident to the resubmergence of said extremities at the end of said phase of emergence, and scum intercepting and detaining baffle means cooperatively associated in the act of scum depression with said agitating and scum depressing mechanism while interposed between operating planes of said paddle elements, and extending into the liquid sufficiently to arrest movement of the floating sewage matter towards takeoff until depressed and beaten down by said paddle elements.

5. A horizontally and longitudinally extending sewage sludge digestion tank having a gas collecting gas-tight top structure including gas offtake means, which tank is adapted to have sludge liquid to be treated by anaerobic digestion pass therethrough in a general horizontal longitudinal direction while being subjected to agitation effect, which digestion has concurrent therewith the formation of scum and floating sewage matter at the liquid surface, said tank having an inlet to supply fresh sludge at one end thereof and an effluent discharge means at the other end arranged to communicate with the tank interior at a point substantially below the body of said top structure and having a point of discharge delivery also located below the body of said top structure, whereby there is normally established a liquid level of substantially predetermined elevation in the tank and which level is spaced from said top structure to establish a gas collecting space below the top structure; a series of sets of agitators disposed in the tank along the general flow path from end to end of the tank and having scum depressing portions travelling in an endless path and designed to extend above the liquid level during a portion of that path; and a number of scum intercepting and detaining transversely extending baffles cooperatively associated with and interposed with respect to said sets of agitators and disposed relative thereto so as to define the area within which the scum depressing effect of a set of agitating means is realized, which baffles immerge into the liquid sufficiently to arrest movement of a desired amount of floating scum matter towards takeoff until sufficiently depressed and beaten down by the scum depressing portions of said agitating means.

6. A horizontally and longitudinally extending sewage sludge digestion tank having a gas collecting gas-tight top structure including gas offtake means, which tank is adapted to have sludge liquid to be treated by anaerobic digestion pass therethrough in a general horizontal longitudinal direction while being subjected to agitation effect, which digestion has concurrent therewith the formation of scum and floating sewage matter at the liquid surface, said tank having an inlet to supply fresh sludge at one end thereof and an effluent discharge means at the other end arranged to communicate with the tank interior at a point substantially below the body of said top structure and having a point of discharge delivery also located below the body of said top structure, whereby there is normally established a liquid level of substantially predetermined elevation in the tank and which level is spaced from said top structure to establish a gas collecting space below the top structure; scum intercepting and detaining baffles disposed at spaced intervals along the tank and immersed into the liquid sufficiently to be effective in arresting movement of floating scum towards said effluent offtake, and a series of scum-depressing radial agitators rotatable in respective vertical planes transverse of the tank and cooperatively associated with said baffles in arresting floating scum to be engaged by sets of said agitators, said agitators having outer extremities extending above the liquid level during a corresponding phase of emergence during rotation, which outer extremities are designed to be effective to depress and beat down scum arrested and detained by said baffle means, incident to the resubmergence of said extremities at the end of said phase of emergence.

7. A horizontally and longitudinally extending sewage sludge digestion tank having a gas collecting gas-tight top structure including gas offtake means, which tank is adapted to have sludge liquid to be treated by anaerobic digestion pass therethrough in a general horizontal longitudinal direction while being subjected to agitation effect, which digestion has concurrent therewith the formation of scum and floating sewage matter at the liquid surface, said tank having an inlet to supply fresh sludge at one end thereof and an effluent discharge means at the other end arranged to communicate with the tank interior at a point substantially below the body of said top structure and having a point of discharge delivery also located below the body of said top structure, whereby there is normally established a liquid level of substantially predetermined elevation in the tank and which level is spaced from said top structure to establish a gas collecting space below the top structure; scum intercepting baffle means disposed in a manner, and extending into the liquid sufficiently to be adapted substantially to arrest movement of floating scum towards takeoff; and a series of agitating scum depressing elements arranged to be movable in vertical transverse planes from above to below the liquid level in the tank and vice versa, and which scum depressing elements are cooperatively associated with said baffle means in a manner to be effective in depressing and beating down scum arrested and detained by said baffle means.

8. A horizontally and longitudinally extending sewage sludge digestion tank having a gas collecting gas-tight sectionalized top structure including gas offtake means, which tank is adapted to have sludge liquid to be treated by anaerobic digestion pass therethrough in a general horizontal longitudinal direction while being subjected to agitation effect, which digestion has concurrent therewith the formation of scum and floating sewage matter at the liquid surface, said tank having an inlet to supply fresh sludge at one end thereof and an effluent discharge means at the other end arranged to communicate with the tank interior at a point substantially below the body of said top structure and having a point of discharge delivery also located below the body of said top structure, whereby there is normally established a liquid level of substantially predetermined elevation in the tank and which level is spaced from said top structure to establish a gas collecting space below the top structure; a series of sets of agitating means including scum depressors arranged to be movable from above to below the liquid surface in the tank and vice versa, disposed along the general flow path from end to end of the tank; a number of scum intercepting and detaining transverse partial partitions subdividing said gas collecting space to form transverse gas collecting sections corresponding to said sectionalized top structure, and extending into the liquid sufficiently to arrest movement of floating matter towards said offtake, said partial partitions cooperatively associated with and interposed with respect to said sets of agitating means and disposed relative thereto to permit a set of said agitating means to depress and beat down scum arrested and detained by said partial partitions.

HERMAN JOSEPH NICOLAAS
HUBERT KESSENER.